United States Patent
Takano

(10) Patent No.: US 9,301,255 B2
(45) Date of Patent: Mar. 29, 2016

(54) WIRELESS COMMUNICATION DEVICE AND WIRELESS COMMUNICATION METHOD

(75) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 147 days.

(21) Appl. No.: 13/641,633

(22) PCT Filed: May 17, 2011

(86) PCT No.: PCT/JP2011/061254
§ 371 (c)(1),
(2), (4) Date: Oct. 16, 2012

(87) PCT Pub. No.: WO2011/148820
PCT Pub. Date: Dec. 1, 2011

(65) Prior Publication Data
US 2013/0034079 A1 Feb. 7, 2013

(30) Foreign Application Priority Data
May 26, 2010 (JP) ................... 2010-120633

(51) Int. Cl.
*H04W 72/04* (2009.01)
*H04W 52/02* (2009.01)
*H04W 72/00* (2009.01)

(52) U.S. Cl.
CPC .......... *H04W 52/0229* (2013.01); *H04W 72/00* (2013.01)

(58) Field of Classification Search
USPC ................................................ 370/330, 478
See application file for complete search history.

(56) References Cited

U.S. PATENT DOCUMENTS

| | | | |
|---|---|---|---|
| 2004/0190482 A1 | 9/2004 | Baum et al. | |
| 2009/0220017 A1* | 9/2009 | Kawamura et al. | 375/260 |
| 2009/0245195 A1 | 10/2009 | Bhattad et al. | |
| 2011/0081932 A1* | 4/2011 | Astely et al. | 455/509 |
| 2012/0071182 A1* | 3/2012 | Cho et al. | 455/501 |

FOREIGN PATENT DOCUMENTS

| | | |
|---|---|---|
| EP | 2 015 488 | 1/2009 |
| EP | 2 023 559 A2 | 2/2009 |
| EP | 2 034 760 A1 | 3/2009 |
| EP | 101479977 | 7/2009 |
| JP | 2000-13870 | 1/2000 |

(Continued)

OTHER PUBLICATIONS

International Search Report issued Jul. 19, 2011 in Application No. PCT/JP2011/061254.

(Continued)

*Primary Examiner* — Dang Ton
*Assistant Examiner* — Pamit Kaur
(74) *Attorney, Agent, or Firm* — Oblon, McClelland, Maier & Neustadt, L.L.P.

(57) ABSTRACT

Provided is a wireless communication device including, in a resource block assigned from among a plurality of resource blocks arranged in a grid pattern on a time axis and a frequency axis, a wireless communication unit for not performing transmission in a non-transmission region and for performing transmission in another region in the source block, the non-transmission region being set at a boundary with an adjacent resource block in a time direction or a frequency direction.

10 Claims, 14 Drawing Sheets

(56) References Cited

FOREIGN PATENT DOCUMENTS

JP 2007-300507 11/2007
WO WO 2009/120941 A2 10/2009

OTHER PUBLICATIONS

"3$^{rd}$ Generation Partnership Project; Technical Specification Group Services and System Aspects; Service requirements for machine-type communications; Stage 1 (Release 10)", Global System for Mobile Communications, 3GPP TS 22.368 V1.1.1 (Nov. 2009), 2009, 23 pages.
"3rd Generation Partnership Project; Technical Specification Group Services and System Aspects; Study on Facilitating Machine to Machine Communication in 3GPP systems; (Release 8)", Global System for Mobile Communications, 3GPP TR 22.868 V8.0.0 (Mar. 2007), 2007, 15 pages.
Office Action issued Nov. 27, 2014 to Chinese Patent Application No. 201180024314.X, with English translation.
Extended European Search Report issued Sep. 7, 2015 to European patent application No. 11786519.6.
Pekka Jänis et al., "Interference-aware resource allocation for device-to-device radio underlaying cellular networks", IEEE 69th Vehicular Technology Conference, Apr. 26, 2009, pp. 1-5.
Chia-Hao Yu et al., "Power optimization of device-to-device communication underlaying cellular communication", IEEE International Conference on Communications—ICC09, Jun. 14, 2009, pp. 1-5.

* cited by examiner

WIRELESS COMMUNICATION DEVICE AND WIRELESS COMMUNICATION METHOD

TECHNICAL FIELD

The present disclosure relates to a wireless communication device and a wireless communication method.

BACKGROUND ART

At present, the standardization of 4G wireless communication system is being carried out in 3GPP (Third Generation Partnership Project). The 4G makes it possible to use techniques such as a relay or carrier aggregation, thereby improving the maximum communication speed and the quality at cell edges. Further, it also has been studied to improve the coverage by introducing a base station other than eNodeB (macrocell base station), such as HeNodeB (Home eNodeB, femtocell base station, small base station for mobile phone) or RHH (Remote Radio Head).

In such a wireless communication system, user equipments are frame-synchronized with a base station based on a synchronization signal transmitted from the base station, and then an internal oscillator of the user equipment is synchronized with an oscillator of the base station with high accuracy. Then, the user equipment periodically receives signals transmitted from the base station and causes the internal oscillator of the user equipment to be matched to the oscillator of the base station.

If there is any discrepancy between the internal oscillator of the user equipment and the oscillator of the base station, then reception and transmission may not be performed at an accurate frequency and time, and thus the accuracy of the internal oscillator of the user equipment is important. Further, the structure of a frame that a base station shares with user equipments is described, for example, in Patent Literature 1.

In order for a base station to simultaneously receive wireless signals transmitted from a plurality of user equipments, each of the user equipments performs an adjustment to the length of time according to the distance between the base station and the user equipment, which is called Timing Advance. Specifically, the Timing Advance is performed in the procedure of random access in which the user equipment transmits a preamble toward a random access window. A Timing Advance value can be obtained from a relationship between an arrival time of the preamble at a base station and the random access window.

Meanwhile, there has been a discussion concerning the MTC (Machine Type Communications) in 3GPP. As an application of MTC, a variety of applications such as Metering for collecting information relevant to water systems or power systems, Health for collecting information relevant to health care instruments, or the like have been studied. The MTC terminal is a terminal designed specifically for these applications.

Furthermore, the MTC terminal has characteristics such as Time Controlled, Online Small Data Transmission, for example. That is, it is expected that the MTC terminal is kept in an idle mode for a large amount of time, and receives signals from a base station or transmits small pieces of information to a base station in a burst manner. In addition, because low power consumption is required for the MTC terminal, it is desirable to keep the length of time taken up by the burst transmission and reception as short as possible. Further, it is considered that the burst transmission and reception are performed in a very long period of interval once every few hours or once every few days, not a period of the order of a few ms or tens of ms at which an existing LTE terminal receives a paging channel.

CITATION LIST

Patent Literature

Patent Literature 1: JP 2000-013870A

SUMMARY OF INVENTION

Technical Problem

However, considering that the MTC terminal may not receive signals from a base station over a long period of time as described above, errors of an internal oscillator of the MTC terminal, the frame synchronization, or the like will be increased. As a result, it is concerned that the accuracy of uplink and downlink communications would be decreased.

Therefore, the present disclosure provides a novel and improved wireless communication device and wireless communication method, capable of suppressing loss of communication accuracy while reducing power consumption.

Solution to Problem

According to an embodiment of the present disclosure, there is provided a wireless communication device including in a resource block assigned from among a plurality of resource blocks arranged in a grid pattern on a time axis and a frequency axis, a wireless communication unit for not performing transmission in a non-transmission region and for performing transmission in another region in the source block, the non-transmission region being set at a boundary with an adjacent resource block in a time direction or a frequency direction.

The wireless communication device may further include a control unit for setting the non-transmission region in the resource block.

The control unit may set the non-transmission region at a boundary with at least one of an adjacent resource block in a front side on the time axis or an adjacent resource block in a rear side on the time axis and at a boundary with at least one of an adjacent resource block in an upper side on the frequency axis or an adjacent resource block in a lower side on the frequency axis.

The control unit may set the non-transmission region having a wider area on the resource block as an elapsed time from a synchronization processing with a communication counterpart becomes increased.

The wireless communication unit may set a length of a guard interval part with respect to a length of a data part in each of the Ofdm symbols constituting the resource block to be longer than a length defined in LTE.

The wireless communication unit may set the guard interval part in each of the Ofdm symbols to be longer than the data part.

The wireless communication unit may use a region for transmission of each of a plurality of Ofdm symbols as one guard interval part and one data part.

The wireless communication unit may set the guard interval part to be longer than the data part.

Further, according to an embodiment of the present disclosure, there is provided a wireless communication method including in a resource block assigned from among a plurality of resource blocks arranged in a grid pattern on a time axis and a frequency axis, not performing transmission in a non-transmission region and performing transmission in another region in the resource block, the non-transmission region being set at a boundary with an adjacent resource block in a time direction or in a frequency direction.

Further, according to an embodiment of the present disclosure, there is provided a wireless communication device including a wireless communication unit for transmitting a wireless signal in a resource block assigned from among a plurality of resource blocks arranged in a grid pattern on a time axis and a frequency axis. The wireless communication unit transmits a reference signal at a head of the resource block at a frequency used to transmit the reference signal in the resource block, and transmits another wireless signal after transmitting the reference signal.

The wireless communication unit may transmit the reference signal at all frequencies used for transmission in the resource block.

Further, according to an embodiment of the present disclosure, there is provided a wireless communication method including assigning a resource block from among a plurality of resource blocks arranged in a grid pattern on a time axis and a frequency axis, and transmitting a reference signal at a head of the resource block at a frequency used to transmit the reference signal in the resource block, and transmitting another wireless signal after transmitting the reference signal.

Advantageous Effects of Invention

As described above, according to a wireless communication device and a wireless communication method related to the present disclosure, it is possible to suppress loss of communication accuracy while keeping power consumption low.

BRIEF DESCRIPTION OF DRAWINGS

FIG. 4 is an explanatory diagram illustrating a problem based on an error of an internal oscillator of the MTC terminal, frame synchronization, or the like.

DESCRIPTION OF EMBODIMENTS

Figure 1:
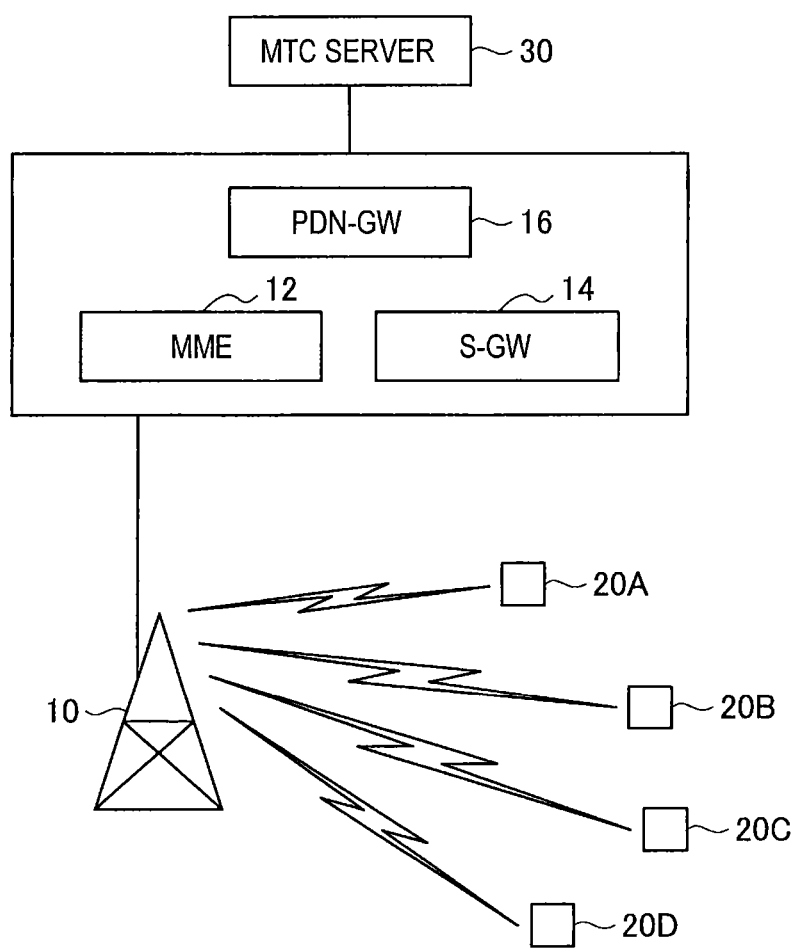
FIG. 1 is an explanatory diagram illustrating an exemplary configuration of a wireless communication system.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Also, in the specification and drawings, a plurality of structural elements having substantially the same functional configuration may be distinguished from each other by each having a different alphabetical letter added to the end of the same reference numeral. For example, a plurality of structural elements having substantially the same functional configuration may be distinguished from each other as necessary, such as MTC terminals 20A, 20B, and 20C. However, if it is not particularly necessary to distinguish each of a plurality of structural elements having substantially the same functional configuration, only the same reference numeral is assigned. For example, if it is not particularly necessary to distinguish between the MTC terminals 20A, 20B, and 20C, they are simply referred to as the MTC terminal 20.

Furthermore, "Description of Embodiments" will be described according to the following item order.

1. Overview of Wireless Communication System
1-1. Configuration of Wireless Communication System
1-2. Frame Synchronization
1-3. Timing Advance
1-4. MTC Terminal
2. Configuration of eNodeB
(Setting of Non-transmission Region)
(Reference Signal for MTC)
(Guard Interval for MTC)
3. Operation of eNodeB
4. Configuration of MTC Terminal
5. Conclusion 1. Overview of Wireless Communication System At present, the standardization of 4G wireless communication system is being carried out in 3GPP. Embodiments of the present disclosure, as an illustrative example, are applicable to the 4G wireless communication system, and thus overview of 4G wireless communication system will be first described.

[1-1. Configuration of Wireless Communication System]

FIG. 1 is an explanatory diagram illustrating an exemplary configuration of a wireless communication system 1. As shown in FIG. 1, the wireless communication system 1 includes an eNodeB 10, a core network, MTC terminals 20, and a MTC server 30. The core network includes a MME (Mobility Management Entity) 12, an S-GW (Serving Gateway) 14, and a PDN (Packet Data Network)-GW 16.

Embodiments of the present disclosure are applicable to a wireless communication device such as an eNodeB 10 and a MTC terminal 20 shown in FIG. 1. However, the eNodeB 10 and the MTC terminal 20 are merely one example of a wireless communication device, and the embodiments of the present disclosure are applicable to a variety of other wireless communication devices. Examples of other wireless communication devices include a user equipment (UE: User Equipment), a relay node which relays communications between a user equipment (MTC terminal 20) and an eNodeB, a Home eNodeB which is a small base station for home, and so on.

The eNodeB 10 is a radio base station that communicates with the MTC terminal 20. Note that only one eNodeB 10 is shown in FIG. 1, but in practice a plurality of eNodeBs can be connected to the core network. In addition, although the illustration is omitted from FIG. 1, the eNodeB 10 is also communicated, for example, with user equipments.

The MME 12 is a device that controls the setup, opening and handover of sessions for data communication. The MME 12 is connected to the eNodeB 10 through an interface called X2.

The S-GW 14 is a device that performs the routing, transfer, and so on, of user data. The PDN-GW 16 acts as a connection point to IP service network and transfers user data from and to the IP service network.

The MTC terminal 20 is a terminal designed specifically for applications for MTC which has been studied in 3GPP and performs a wireless communication with the eNodeB 10 depending on the applications. In addition, the MTC terminal 20 performs a bidirectional communication with the MTC server 30 through the core network. A user executes a particular application by accessing the MTC server 30. The user normally does not directly access the MTC terminal 20. This MTC terminal 20 will be described in detail in "1-4. MTC Terminal".

[1-2. Frame Synchronization]

It is expected that, though the details are not provided, the eNodeB 10 and the MTC terminal 20 described above will perform the wireless communication in a way similar to the communication between the eNodeB 10 and the user equipment. Therefore, a radio frame which is shared between the eNodeB 10 and the user equipment and the frame synchronization will be described below. The details described below can be incorporated into the communication between the eNodeB 10 and the MTC terminal 20.

Figure 2:
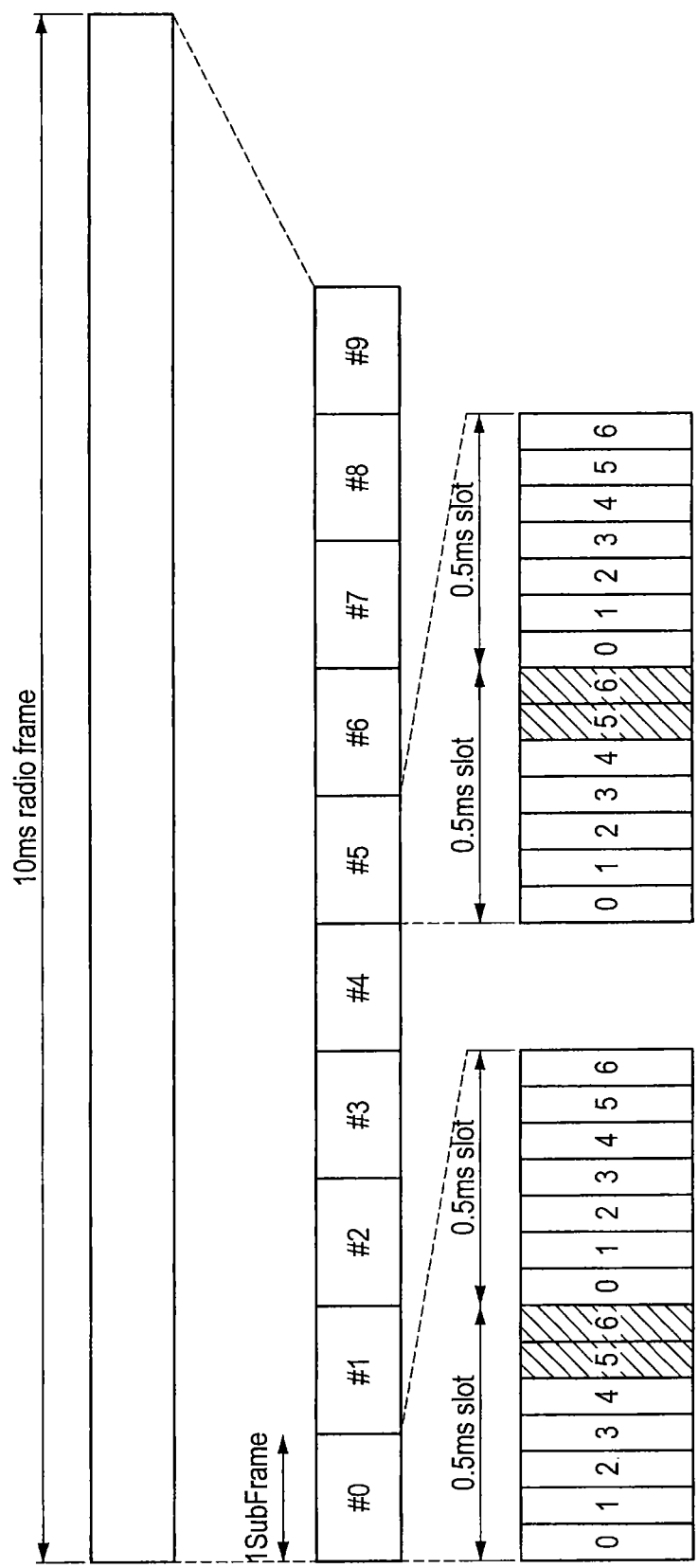
FIG. 2 is an explanatory diagram illustrating a frame format of 4G

FIG. 2 is an explanatory diagram illustrating a frame format of 4G. As shown in FIG. 2, a radio frame of 10 ms is composed of 10 subframes #0 to #9, each 1 ms long. Each subframe of 1 ms is composed of two slots of 0.5 ms each. In addition, each slot of 0.5 ms is composed of 7 Ofdm symbols.

Further, in the Ofdm symbols drawn with a diagonal line through it as shown in FIG. 2, synchronization signals used for frame synchronization by the user equipment are transmitted. More specifically, a secondary synchronization signal is transmitted in the fifth Ofdm symbol of subframe #0, a primary synchronization signal is transmitted in the sixth Ofdm symbol of subframe #0, a secondary synchronization signal is transmitted in the fifth Ofdm symbol of subframe #5, and a primary synchronization signal is transmitted in the sixth Ofdm symbol of subframe #5.

The user equipment acquires a period of 5 ms by using the primary synchronization signal, and at the same time, detects a cell number group corresponding to a present location from the cell number groups which are divided into three groups. Subsequently, the user equipment acquires a radio frame period (a period of 10 ms) by using the secondary synchronization signal.

Moreover, a Zadoff-Chu sequence is used for a code sequence of the synchronization signal. Because 168 types of coding sequences are used in the cell number in the cell number group and two types of coding sequences are used to obtain a radio frame period, 336 types of coding sequences are prepared. The user equipment can determine whether a received subframe is the subframe #0 or the subframe #5, based on a combination of the secondary synchronization signal transmitted in the subframe #0 and the secondary synchronization signal transmitted in the subframe #5.

An internal oscillator of the user equipment is synchronized with an oscillator of the eNodeB 10 with high accuracy after the user equipment performs frame synchronization as described above. Then, the user equipment periodically receives signals transmitted from the base station and causes the internal oscillator of the user equipment to be matched to the oscillator of the base station. If there is any discrepancy between the internal oscillator of the user equipment and the oscillator of the base station, then reception and transmission may not be performed at an accurate frequency and time, and thus the accuracy of the internal oscillator of the user equipment is important.

[1-3. Timing Advance]

In order for the eNodeB 10 to simultaneously receive wireless signals transmitted from a plurality of user equipments, 4G user equipment performs an adjustment to the length of time according to the distance between the eNodeB 10 and the user equipment, which is called Timing Advance. Specifically, the Timing Advance is performed in the procedure of random access in which the user equipment transmits a preamble toward a random access window. A Timing Advance value can be obtained from a relationship between an arrival time of the preamble at the eNodeB 10 and the above-mentioned random access window.

It is conceivable that, though the details are not provided, the MTC terminal 20 also performs the Timing Advance and acquires a Timing Advance value in a similar way to the user equipment.

[1-4. MTC Terminal]

The MTC terminal 20 is a terminal designed specifically for applications for MTC which has been studied in 3GPP, as described above. Examples of the applications for MTC are as follows:

1. Security
2. Trcking & Tracing
3. Payment
4. Health
5. Remote Maintenance/Control
6. Metering
7. Consumer Devices As an example, the MTC terminal 20 may be an electrocardiogram measuring device corresponding to "4. Health" in the list above. In this case, if a user inputs a command for requesting the MTC server 30 to report electrocardiogram measurements, the MTC server 30 requests the MTC terminal 20 to report the electrocardiogram measurements, and then the electrocardiogram measurements are reported from the MTC terminal 20 to the MTC server 30.

As another example, the MTC terminal 20 may be a vending machine corresponding to "3. Payment" in the list above. In this case, if a user inputs a command for requesting the MTC server 30 to report the sales volume, the MTC server 30 requests the MTC terminal 20 to report the sales volume, and then the sales volume is reported from the MTC terminal 20 to the MTC server 30.

The characteristics of such MTC terminal 20 are described below. In addition, the MTC terminal 20 is not necessary to have all of the characteristics described below.

1. Low Mobility
2. Time Controlled
3. Time Tolerant
4. Packet Switched Only
5. Online Small Data Transmissions
6. Offline Small Data Transmission
7. Mobile Originated Only 8. Infrequent Mobile Terminated
9. MTC Monitoring
10. Offline Indication
11. Jamming Indication
12. Priority Alarm Message
13. Extra Low Power Consumption
14. Secure Connection
15. Location Specific Trigger
16. Group based MTC Features Summarizing the above, the MTC terminal 20 has a little movement, has a few connections to the eNodeB 10 to communicate a small amount of data, and then again returns to an idle mode. Further, some amount of delay is acceptable in data communication. In addition, the MTC terminal 20 requires extra low power consumption (13. Extra Low Power Consumption).

In this regard, the number of the MTC terminals 20 to be used in the future is expected. At present, nearly two billion and seven hundred million people out of the world's population of more than six billion people are using cellular phones. On the other hand, in the situation that there are nearly five hundred trillion machines in the world, nearly five hundred million machines are using cellular phones as the MTC terminal 20.

That is, although the MTC terminals 20 are not yet widely used at present, on the order of one hundred trillion MTC terminals 20 would be more likely to be accommodated in the cellular phones all over the world in the future. Consequently, it is expected that an expanded number of MTC terminals 20 would be accommodated in each eNodeB 10.

(Why the Embodiments of the Present Disclosure are Conceived)

The focus is placed on the MTC terminal 20 having characteristics such as a Time Controlled, an Online Small Data Transmission, or the like among characteristics of the above-mentioned MTC terminal 20. It is expected that such a MTC terminal 20 is kept in an idle mode for a large amount of time, and receives signals from an eNodeB 10 or transmits small pieces of information to the eNodeB 10 in a burst manner. In addition, because low power consumption is required for the MTC terminal 20, it is desirable to keep the length of time taken up by the burst transmission and reception as short as possible. Further, it is considered that the burst transmission and reception are performed in a very long period of interval once every few hours or once every few days, not a period of the order of a few ms or tens of ms at which an existing LTE terminal receives a paging channel.

However, considering that the MTC terminal 20 may not receive a signal from a base station over a long period of time as described above, there is a problem that errors of an internal oscillator of the MTC terminal 20, frame synchronization, a Timing Advance value, or the like would be increased. As a result, it is concerned that the accuracy of uplink and downlink communications would be decreased. The above-mentioned problems will be described in detail below with reference to FIG. 3 and FIG. 4.

Figure 3:
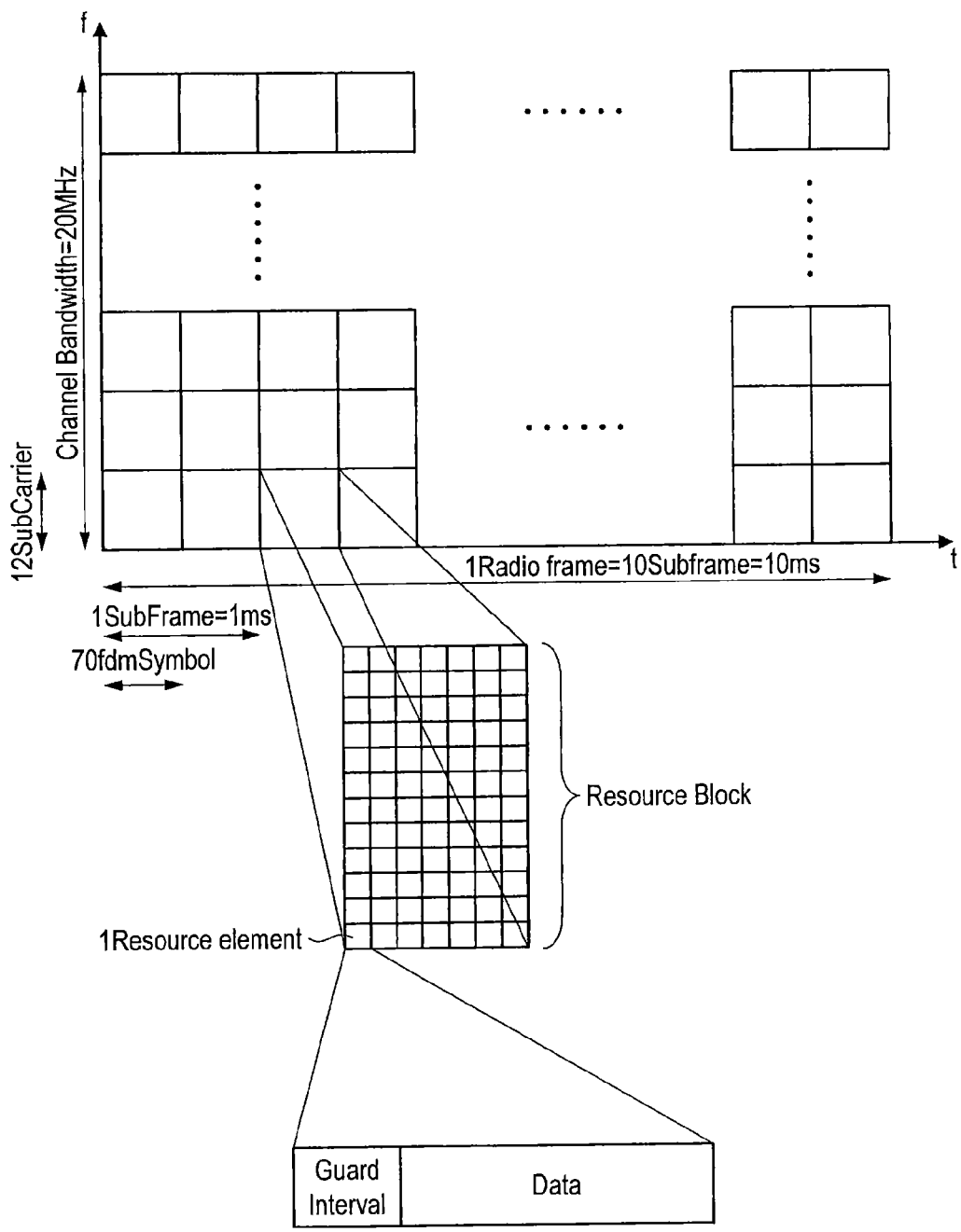
FIG. 3 is an explanatory diagram illustrating resource blocks.

FIG. 3 is an explanatory diagram illustrating resource blocks. As shown in FIG. 3, the resource blocks are arranged in a grid pattern on a frequency direction and a time direction. In addition, the resource blocks each consist of 12 subcarriers×7 Ofdm symbols. Also, a guard interval is added to each head of the respective resource elements consisting of 1 subcarrier×1 Ofdm symbol. The eNodeB 10 can perform resource allocation for each resource block.

Figure 4:
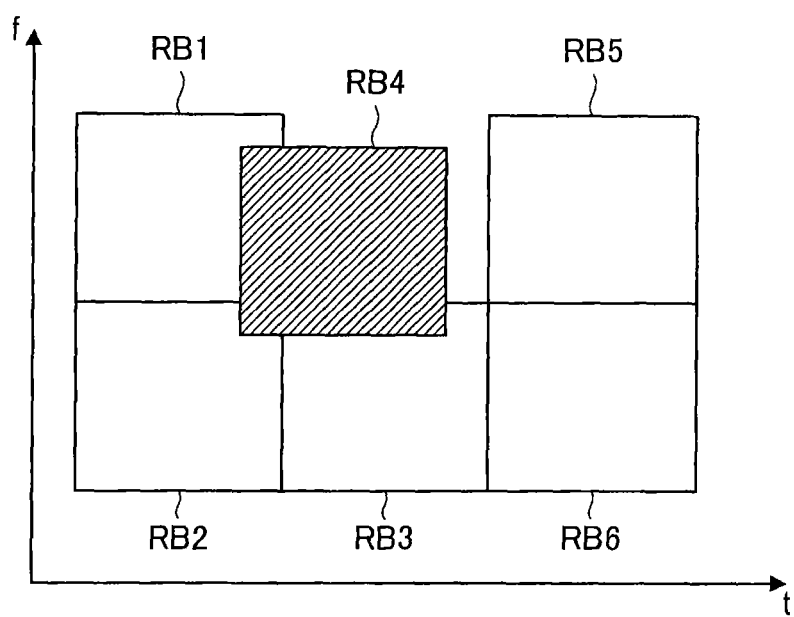

FIG. 4 is an explanatory diagram illustrating problems based on errors of an internal oscillator of the MTC terminal 20, frame synchronization, or the like. For example, there is considered a case where resource blocks RB1 to RB3 are allocated for an uplink of the MTC terminal 20A and a resource block RB4 is allocated for an uplink of the MTC terminal 20B. Further, an internal oscillator of the MTC terminal 20B is assumed to have an error.

In this case, if the MTC terminal 20B transmits a wireless signal to the eNodeB 10 in the resource block RB4, as shown in FIG. 4, the wireless signal would be reached to the eNodeB 10 at a time and frequency not matched to the original resource block RB4. Therefore, in the eNodeB 10, the wireless signal transmitted from the MTC terminal 20B is interfered with a wireless signal transmitted from the MTC terminal 20A in the resource blocks RB1 to RB3. Such interference between the resource blocks may cause a reception failure. A similar problem also occurs in the downlink.

Therefore, the embodiments of the present disclosure have been designed by considering the above-mentioned circumstances as a problem to be solved. According to the embodiments of the present disclosure, it is possible to suppress interference between resource blocks and the resultant loss in communication accuracy, while keeping power consumption low. The embodiments of the present disclosure will be described in detail below.

2. Configuration of eNodeB

Figure 5:
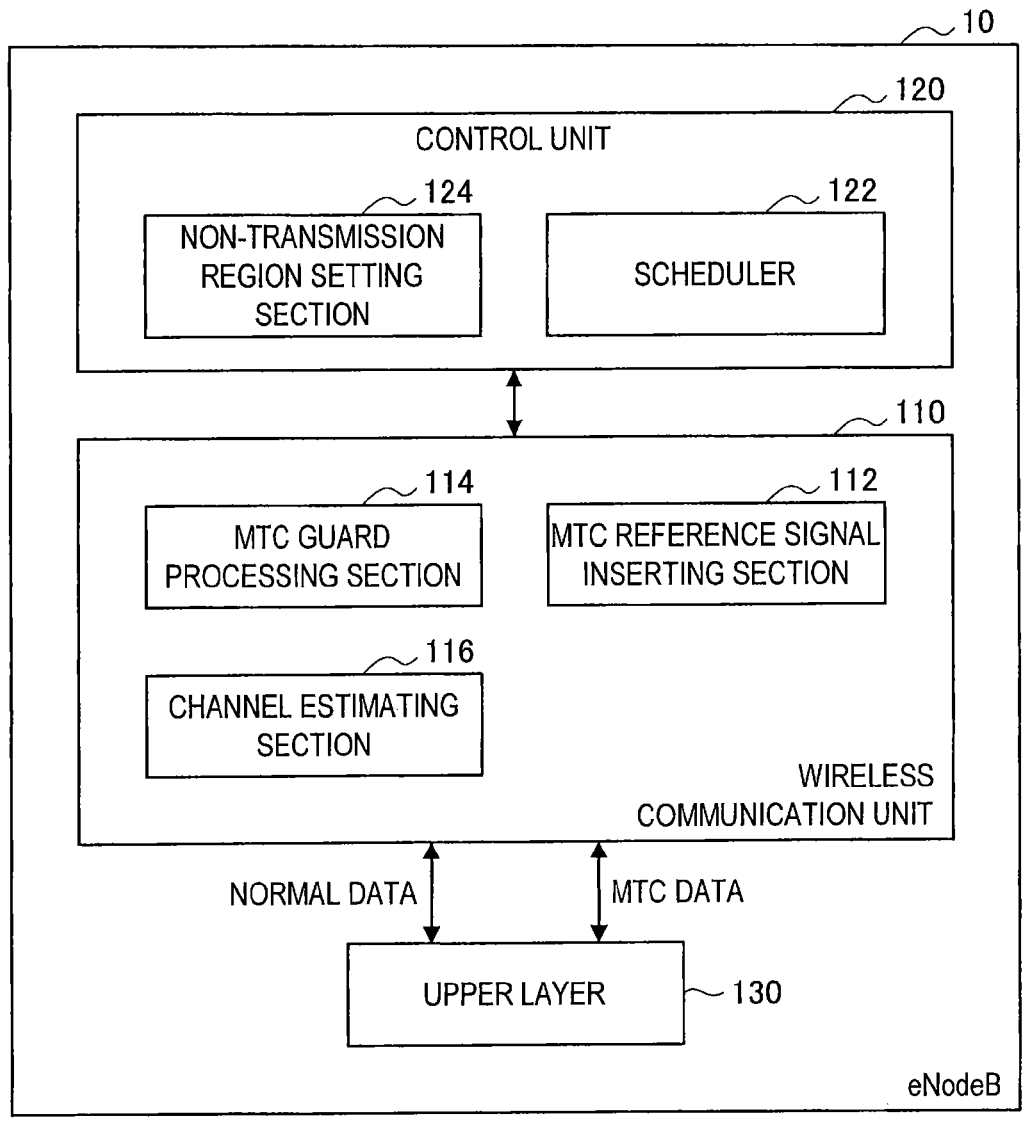
FIG. 5 is an explanatory diagram illustrating a configuration of an eNodeB according to an embodiment of the present disclosure.

FIG. 5 is an explanatory diagram illustrating a configuration of an eNodeB 10 according to the embodiment of the present disclosure. As shown in FIG. 5, the eNodeB 10 includes a wireless communication unit 110, a control unit 120, and an upper layer 130.

The wireless communication unit 110 has a function as a receiver for receiving a control signal, data, and so on from the MTC terminal 20, and a function as a transmitter for transmitting a control signal, data, and so on to the MTC terminal 20. Specifically, the wireless communication unit 210 performs a wireless signal processing and an antenna signal processing such as modulation or demodulation, and a mapping, de-mapping or interleaving of signals. Normal data and MTC data are inputted and outputted between the wireless communication unit 110 and the upper layer 130. The Normal data is transmitted and received between the wireless communication unit 110 and user equipments, and the MTC data is transmitted and received between the wireless communication unit 110 and the MTC terminal 20.

In addition, the wireless communication unit 110 includes a MTC reference signal inserting section 112, a MTC guard processing section 114, and a channel estimating section 116. The channel estimating section 116 estimates channel conditions between the eNodeB 10 and the MTC terminal 20 based on a reference signal received from the MTC terminal 20. The MTC reference signal inserting section 112 and the MTC guard processing section 114 perform an addition of a reference signal for MTC and a guard interval for MTC when a communication counterpart is the MTC terminal 20. The reference signal for MTC and the guard interval for MTC will be described in detail later.

The control unit 120 is configured to control the overall communication of the eNodeB 10. The control unit 120 includes a scheduler 122 and a non-transmission region setting section 124. The scheduler 122 assigns a resource block to the MTC terminal 20 belonging to the eNodeB 10. The MTC terminal 20 performs uplink or downlink communication by using the resource block assigned by the scheduler 122.

The non-transmission region setting section 124 sets a non-transmission region in the resource block assigned for the downlink by the scheduler 122. The wireless communication unit 110 does not transmit a wireless signal in the non-transmission region which is set by the non-transmission region setting section 124, but the wireless communication unit 110 transmits a wireless signal only in regions other than the non-transmission region. The non-transmission region will be described in detail below.

(Setting of Non-Transmission Region)

As described above with reference to FIG. 4, even in both of the downlink communication and the uplink communication, interference between resource blocks occurs due to errors of an internal oscillator of the MTC terminal 20, frame synchronization, or the like. Thus, in the resource block assigned for the downlink by the scheduler 122, the non-transmission region setting section 124 sets a non-transmission region at the boundary with adjacent resource blocks in at least one of a time direction and a frequency direction.

Figure 6:
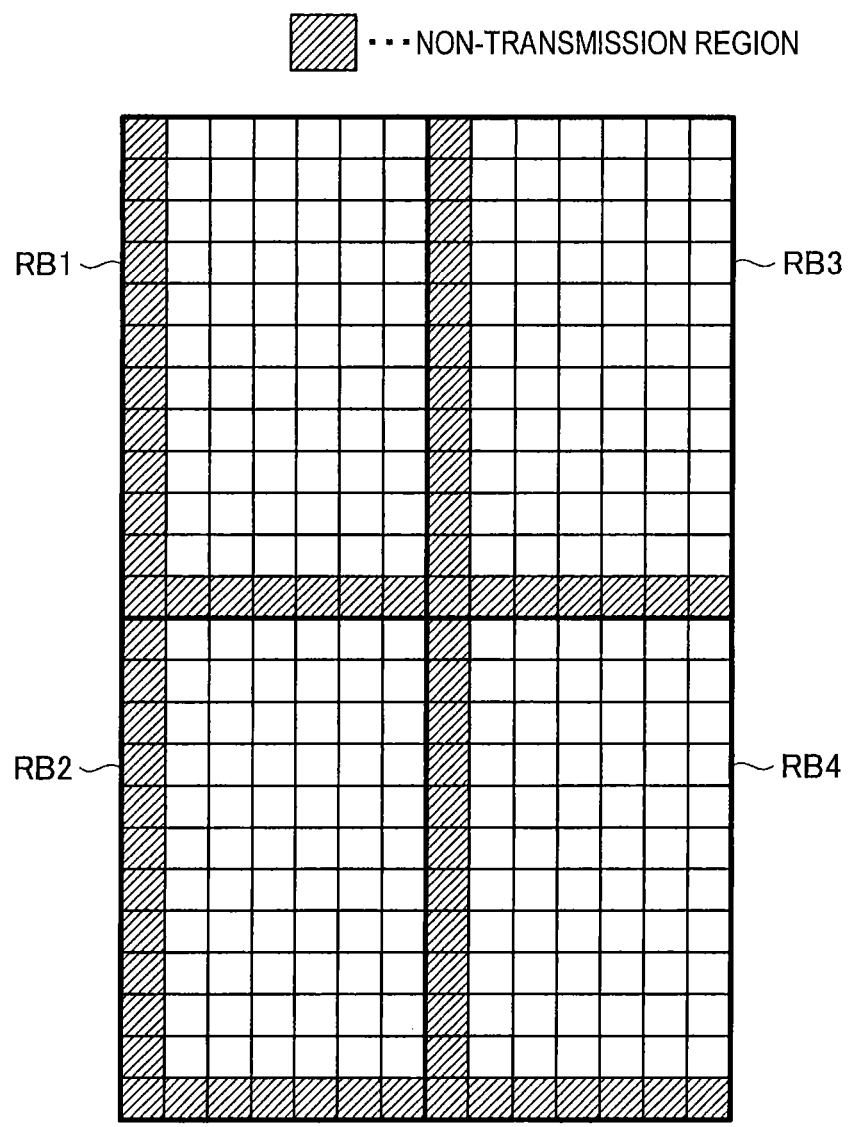
FIG. 6 is an explanatory diagram illustrating a setting example of a non-transmission region.

FIG. 6 is an explanatory diagram illustrating a setting example of the non-transmission region. In the example shown in FIG. 6, the non-transmission region is set at the boundary with an adjacent resource block in the front side on the time axis of the respective resource blocks and the boundary with an adjacent resource block in the lower side on the frequency axis. More specifically, in the resource block 3, the non-transmission region corresponding to one resource element is set at the boundary with the adjacent resource block RB1 in the front side on the time axis and the boundary with the adjacent resource block RB4 in the lower side on the frequency axis.

With this configuration, even if a resource block to be received by the MTC terminal 20 has an error of as much as one resource element in each of the frequency direction and the time direction, interference between the resource blocks can be prevented.

For example, there is considered a case where a time-frequency region of the target to be received by the MTC terminal 20 assigned with the resource block RB2 is shifted from the resource block RB2 to the resource block RB1 side and to the resource block RB4 side by one resource element each. In this case, because the resource elements of the resource blocks RB1 and RB4 included in the time-frequency region which is the target to be received are non-transmission regions, the MTC terminal 20 can receive only the wireless signals transmitted from the eNodeB 10 in the resource block RB2.

Moreover, the resource elements in non-transmission regions which are set by the non-transmission region setting section 124 are not limited to the example shown in FIG. 6. For example, the non-transmission region setting section 124 may set the non-transmission region at the boundaries with every adjacent resource block among the resource blocks. In addition, the non-transmission region setting section 124 may set a plurality of resource elements of each boundary as non-transmission regions. Further, the non-transmission region setting section 124, as shown in FIG. 7, may set different non-transmission regions for the respective resource blocks or for the respective MTC terminals 20 used as destinations.

Figure 7:
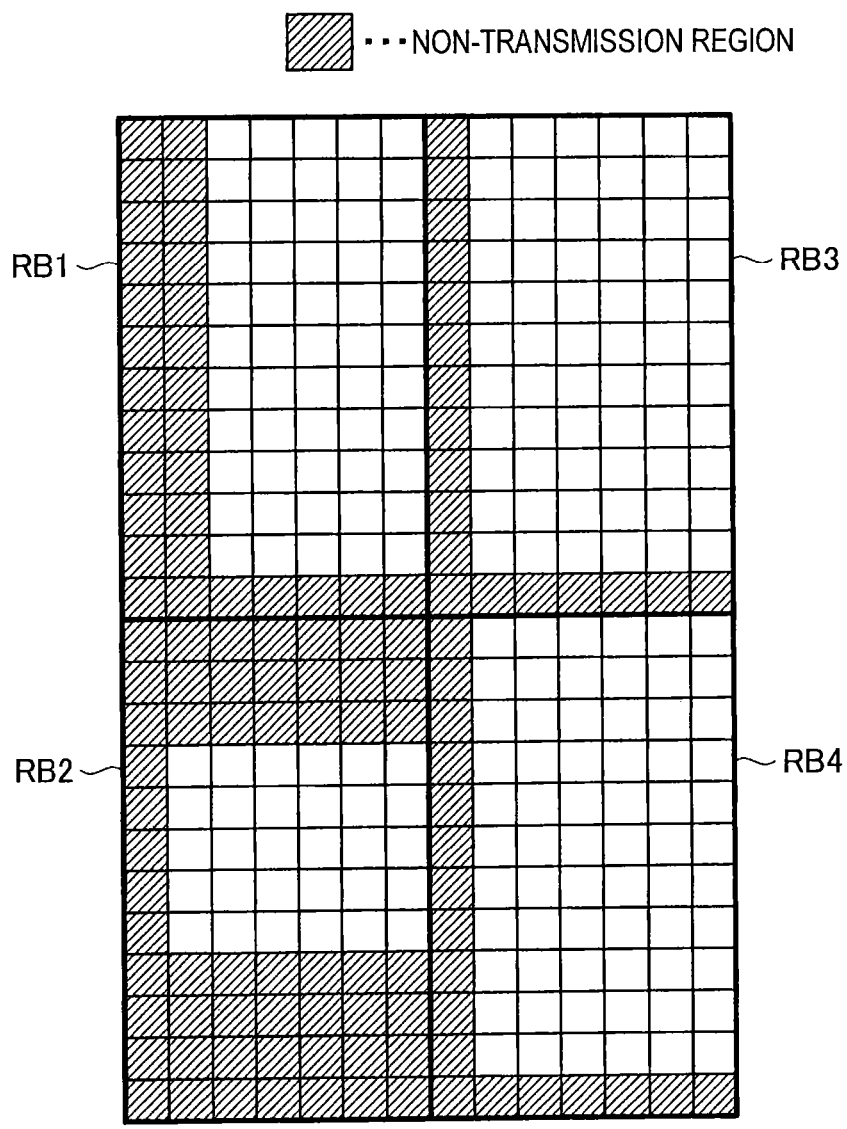
FIG. 7 is an explanatory diagram illustrating another setting example of the non-transmission region.

FIG. 7 is an explanatory diagram illustrating another setting example of the non-transmission region. In the resource block RB1 shown in FIG. 7, the non-transmission region corresponding to two resource elements is set at the boundary with the adjacent resource block in the front side of the time direction, the non-transmission region corresponding to one resource element is set at the boundary with the adjacent resource block RB3 in the rear side, and the non-transmission region corresponding to one resource element is set at the boundary with the adjacent resource block RB2 in the lower side of the frequency direction.

On the other hand, in the resource block RB2, the non-transmission region corresponding to one resource element is set at the boundary with the adjacent resource block in the front side of the time direction, the non-transmission region corresponding to four resource elements is set at the boundary with the adjacent resource block RB in the lower side of the frequency direction, and the non-transmission region corresponding to three resource elements is set at the boundary with the adjacent resource block RB1 in the upper side of the frequency direction.

In this way, the non-transmission region setting section 124 may set different non-transmission regions for the respective resource blocks or for the respective MTC terminals 20 used as destinations. Here, it is effective to set a wide non-transmission region to the MTC terminal 20 in which an error of an oscillator, frame synchronization, or the like is large. Thus, the non-transmission region setting section 124 may estimate the magnitude of the error in the MTC terminal 20 and set the non-transmission region according to the magnitude of the error. This configuration allows degradation of throughput due to setting of the non-transmission region which is wider than necessary to be prevented. In addition, the non-transmission region setting section 124 may estimate, for example, the magnitude of the error using an elapsed time from frame synchronization by the MTC terminal 20, an elapsed time from Timing Advance, a reception success rate, and so on.

(Reference Signal for MTC)

The MTC reference signal inserting section 112 inserts a reference signal into the resource block assigned for the downlink to the MTC terminal 20. Prior to a detailed description of the MTC reference signal inserting section 112, an arrangement position of the reference signal to be transmitted to the MTC terminal will be described with reference to FIG. 8.

Figure 8:
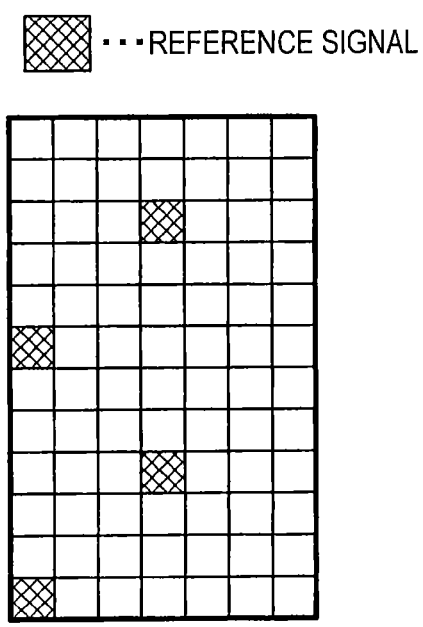
FIG. 8 is an explanatory diagram illustrating a normal arrangement position of a reference signal.

FIG. 8 is an explanatory diagram illustrating a normal arrangement position of the reference signal. As shown in FIG. 8, the reference signals are usually inserted into a plurality of resource elements of the resource blocks in a distributed manner. User equipments obtain channel information for receiving data by receiving the reference signal over one or more than one of resource blocks and supplementing it in a frequency direction and a time direction. Also, in the uplink, the reference signal is inserted in a manner similar to that described above.

However, it is not appropriate to apply such arrangement of the normal reference signal to the reference signal which is to be transmitted to the MTC terminal 20. This because, with respect to the downlink, the MTC terminal 20 receives a resource block as soon as power is turned on, and thus it is not practical to receive a reference signal for a long time so as to supplement channel information. Similarly, with respect to the uplink, the respective MTC terminals 20 use a resource block having an error in the frequency direction and the time direction, and thus it is difficult that the eNodeB 10 takes an enough time to obtain channel information based on the reference signal.

In view of the above circumstances, the MTC reference signal inserting section 112 inserts the reference signal intensively into the head of the resource block assigned for the downlink to the MTC terminal 20. This will be described in detail below with reference to FIG. 9.

Figure 9:
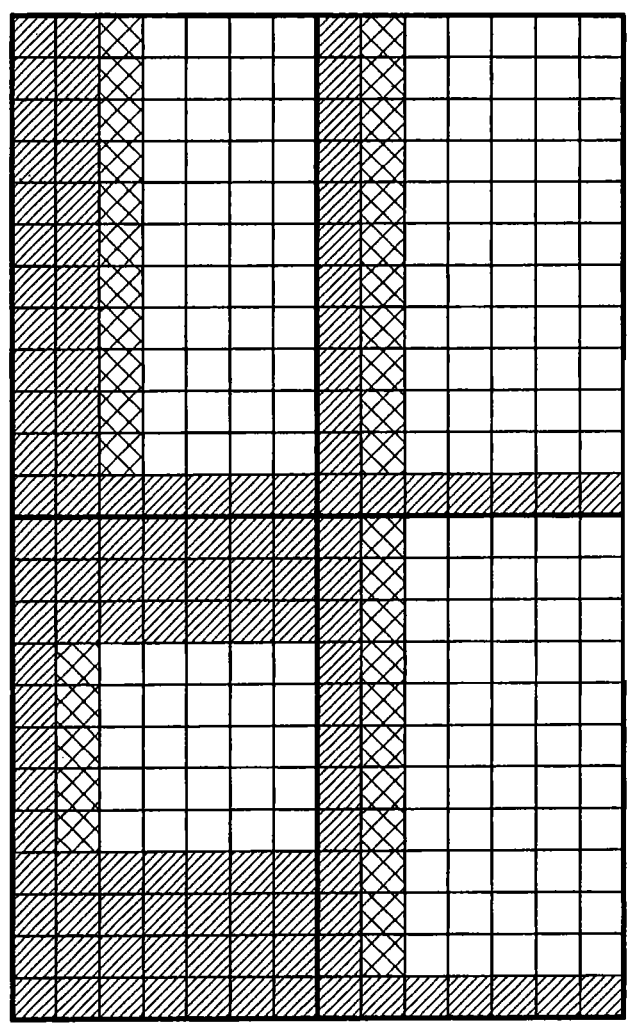
FIG. 9 is an explanatory diagram illustrating an arrangement example of the reference signal according to the embodiment of the present disclosure.

FIG. 9 is an explanatory diagram illustrating an arrangement example of the reference signal according to the embodiment of the present disclosure. As shown in FIG. 9, the MTC reference signal inserting section 112 inserts the reference signal into heads of all frequencies to be used for transmission in the respective resource blocks. In addition, if the non-transmission region is set as shown in FIG. 9, the MTC reference signal inserting section 112 inserts the reference signal into directly next to the non-transmission region. If the non-transmission region is not set, the MTC reference signal inserting section 112 inserts the reference signal into the head of the resource block.

With this configuration, the early reception of the reference signal at all frequencies is possible, thus it is expected to reduce time required for the MTC terminal 20 to obtain channel information. In addition, the example that the MTC reference signal inserting section 112 inserts the reference signal into all frequencies has been described above, but the reference signal may be inserted into some frequencies rather than all frequencies.

(Guard Interval for MTC)

The MTC guard processing section 114 adds a guard interval to an Ofdm symbol which is to be transmitted to the MTC terminal 20 and extracts data from the Ofdm symbol received from the MTC terminal 20. Prior to a detailed description of the MTC guard processing section 114, the guard interval of a normal Ofdm symbol to be transmitted to a user equipment will be described.

The Ofdm symbol consists of a guard interval and data, as shown in FIG. 3. A normal guard interval is designed to be longer than the delay time of the reflected wave having the slowest arrival time to the direct wave so as to suppress the influence due to a multi-path. When a certain length of signal is extracted from the Ofdm symbol composed by the guard interval and data, it is known that data can be correctly decoded.

However, because the frame synchronization in a time direction is expected to be incomplete in the MTC terminal 20, it is difficult for the both eNodeB 10 and MTC terminal 20 to accurately extract signals from the received Ofdm symbol in a normal guard interval.

In view of above circumstances, the MTC guard processing section 114 sets the guard interval to be longer than a normal length defined in LTE. For example, the MTC guard processing section 114 sets the length of the guard interval to be longer than data, as shown in the lower portion of FIG. 10. With this configuration, the tolerance of an error related to the position at which the signal is extracted in the MTC terminal 20 is significantly increased, and thus it is possible to improve a reception success rate.

Figure 11:
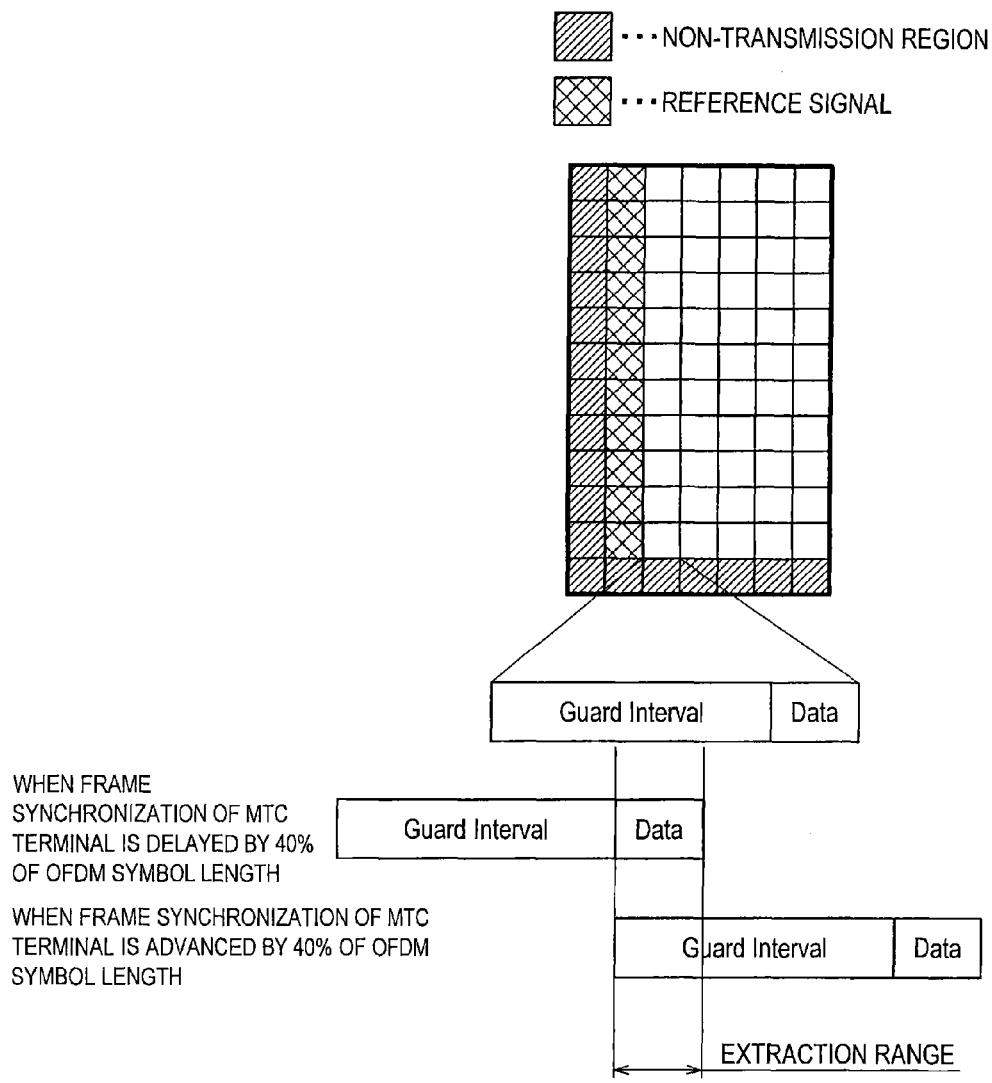
FIG. 11 is an explanatory diagram illustrating an example of a guard interval.

More specifically, the ratio of the guard interval length to the data length may be set 80% to 20%. With this configuration, the MTC terminal 20 extracts the signal from the center of the Ofdm symbol as shown in FIG. 11, and thus if the error of frame synchronization of the MTC terminal 20 is within the range of −40% to 40% of Ofdm symbol length, the data can be decoded correctly. In this way, in addition to setting of the non-transmission region, the guard interval is set to be longer, thereby preventing interference between the resource blocks and interference between the Ofdm symbols.

Figure 12:
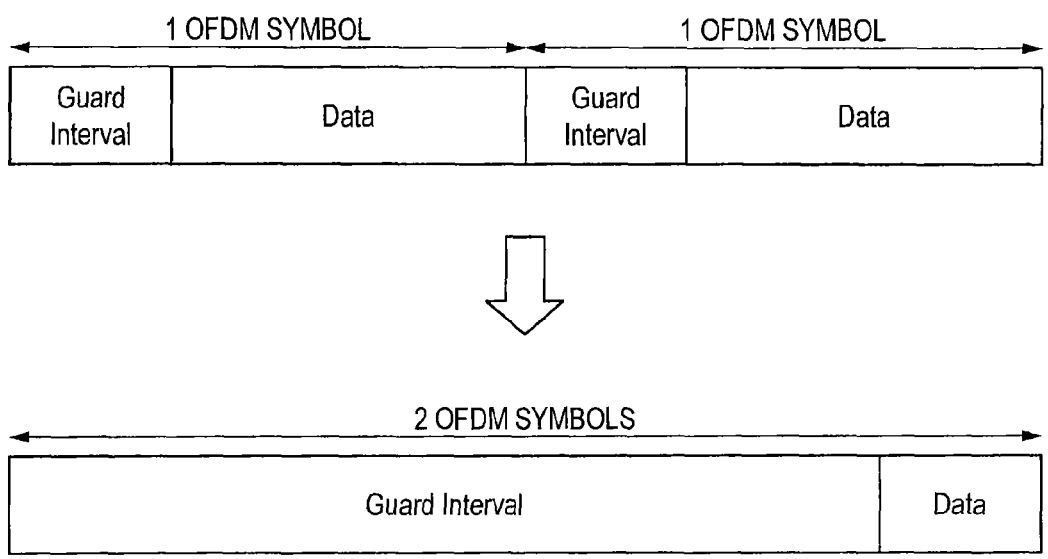
FIG. 12 is an explanatory diagram illustrating an example of a guard interval.

Furthermore, the MTC guard processing section 114 may estimate the magnitude of the error in the MTC terminal 20 and set the length of the guard interval according to the magnitude of the error, as similar to the width of the non-transmission region. This configuration allows degradation of throughput due to setting of the non-transmission region which is wider than necessary to be prevented. In addition, as a modified example shown in FIG. 12, the transmittable region of a plurality of Ofdm symbols may be used as a one part of the guard interval and as a one part of data. With this configuration, it is possible to further lengthen the guard interval.

3. Operation of eNodeB

The configuration of the eNodeB 10 according to the embodiment of the present disclosure has been described above. Next, with reference to FIG. 13, an operation of the eNodeB 10 according to the embodiment of the present disclosure will be described.

Figure 13:
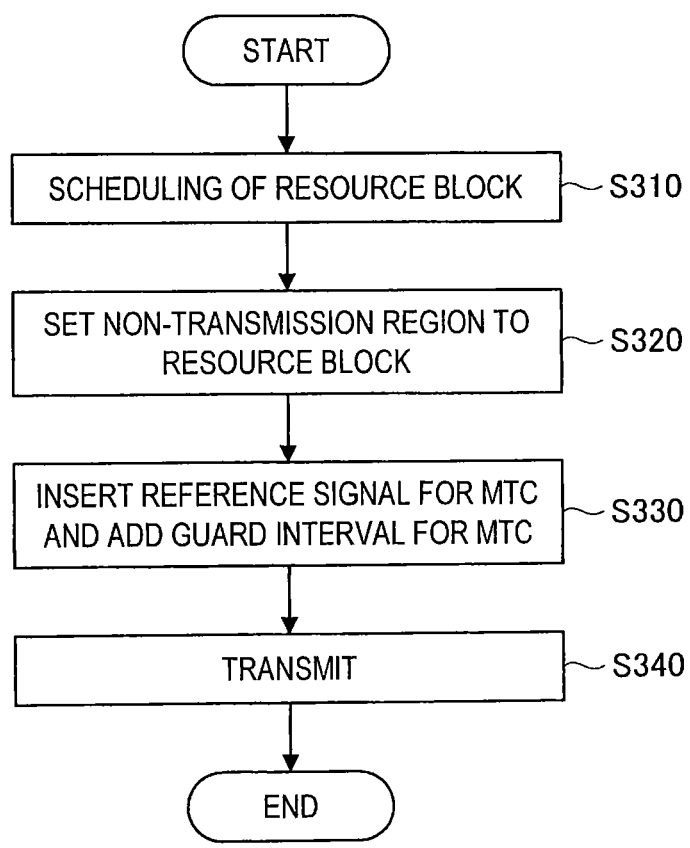
FIG. 13 is a flowchart showing an operation of an eNodeB according to the embodiment of the present disclosure.

FIG. 13 is a flowchart showing an operation of the eNodeB 10 according to the embodiment of the present disclosure. As shown in FIG. 13, the scheduler 122 of the eNodeB 10 performs a scheduling of the resource block for the respective MTC terminals 20 (S310). Then, the non-transmission region setting section 124 sets a non-transmission region in the resource block assigned for the downlink by the scheduler 122 (S320). In this case, in the resource block assigned for the downlink by the scheduler 122, the non-transmission region setting section 124 sets the non-transmission region at the boundary with an adjacent resource block in at least one of the time direction and the frequency direction.

Further, the MTC reference signal inserting section 112 inserts a reference signal into the head of the resource block, and the MTC guard processing section 114 adds a guard interval longer than that defined in LTE to respective Ofdm symbols (S330). Subsequently, the wireless communication unit 110 transmits the signal obtained in S330 in a region other than the non-transmission region (S340).

4. Configuration of MTC Terminal

The configuration and operation of the eNodeB 10 according to the embodiment of the present disclosure have been described above. Next, the MTC terminal 20 according to the embodiment of the present disclosure will be described. The MTC terminal 20 according to the embodiment of the present disclosure, as similar to the eNodeB 10, does not perform any transmission in the non-transmission region, and perform a transmission of a reference signal to the head of the resource block. Also, The MTC terminal 20 lengthens a guard interval, thereby preventing interference between the resource blocks and between the Ofdms. The configuration of such MTC terminal 20 will be described in detail below.

Figure 14:
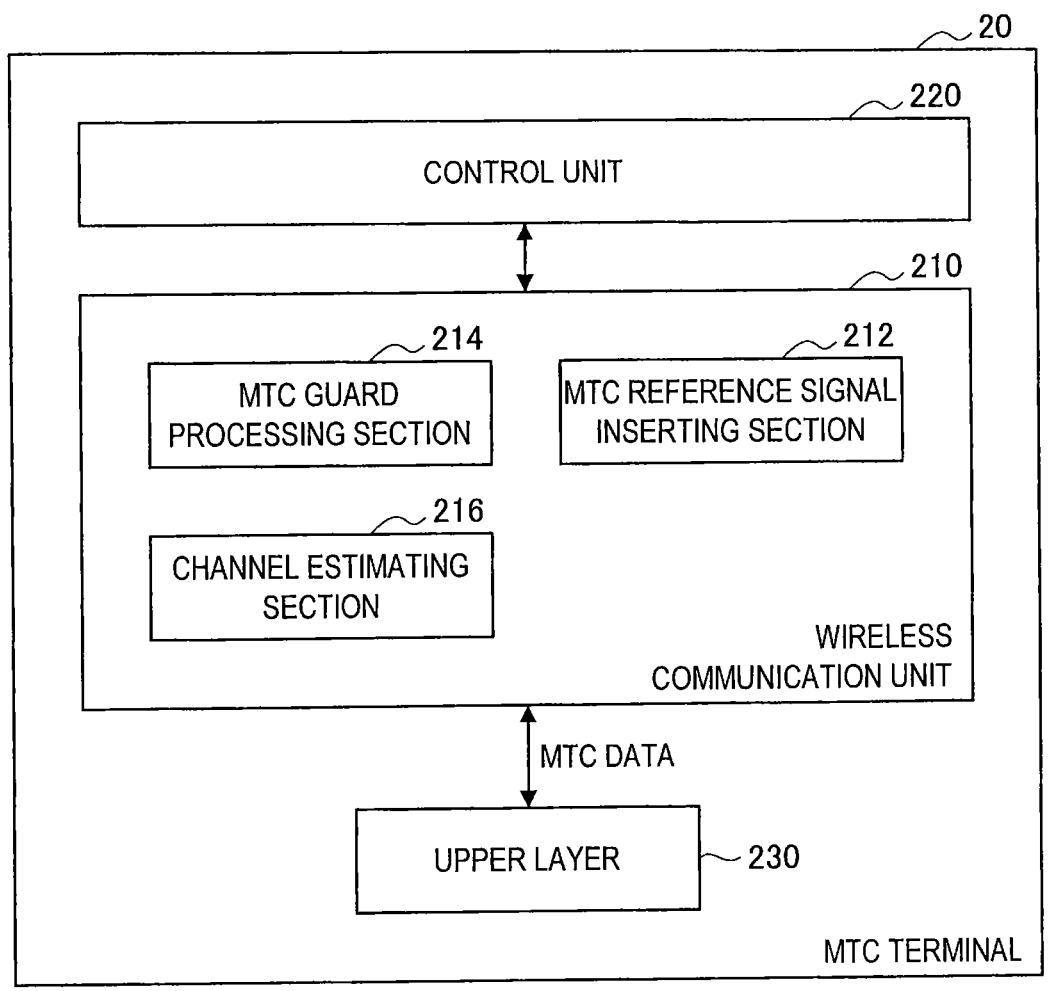
FIG. 14 is an explanatory diagram illustrating a configuration of a MTC terminal according to the embodiment of the present disclosure.

FIG. 14 is an explanatory diagram illustrating a configuration of the MTC terminal 20 according to the embodiment of the present disclosure. As shown in FIG. 14, the MTC terminal 20 according to the embodiment of the present disclosure includes a wireless communication unit 210, a control unit 220, and an upper layer 230.

The wireless communication unit 210 functions as a receiver for receiving a control signal, data, and so on from an eNodeB 10, and functions as a transmitter for transmitting a control signal, data, and so on to the eNodeB 10. Specifically, the wireless communication unit 210 performs a wireless signal processing and an antenna signal processing such as modulation or demodulation, and a mapping, de-mapping or interleaving of signals. MTC data which is transmitted and received between the wireless communication unit 210 and the eNodeB 10 is inputted and outputted between the wireless communication unit 210 and the upper layer 230.

In addition, the wireless communication unit 210 includes a MTC reference signal inserting section 212, a MTC guard processing section 214, and a channel estimating section 216. The channel estimating section 216 estimates channel conditions between the eNodeB 10 and the MTC terminal 20 based on a reference signal received from the eNodeB 10.

The MTC reference signal inserting section 112 has a configuration substantially similar to the MTC reference signal inserting section 212 of the eNodeB 10. For example, the MTC reference signal inserting section 112 inserts the reference signal into the head of all or part of the frequencies of resource blocks for the uplink as shown in FIG. 9. With this configuration, it is expected to reduce time required for the eNodeB 10 which is an uplink receiving side to obtain channel information.

Figure 10:
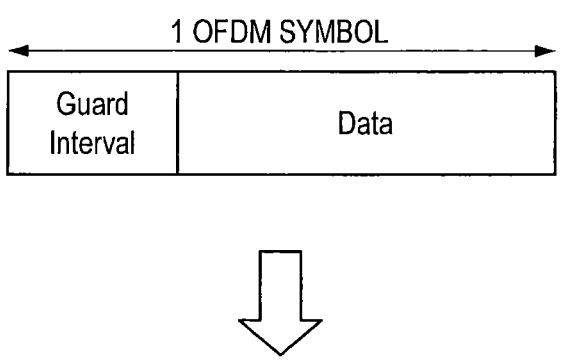
FIG. 10 is an explanatory diagram illustrating an example of a guard interval.
Figure 10:
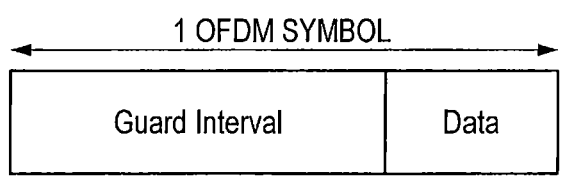

The MTC guard processing section 214 has a configuration substantially similar to the MTC guard processing section 114 of the eNodeB 10. For example, the MTC guard processing section 214 makes the length of the guard interval longer than data, as shown in FIG. 10. With this configuration, the tolerance of an error related to the frame synchronization of the MTC terminal 20 is significantly increased, and thus it is possible to improve a reception success rate by the eNodeB 10.

The control unit 220 is configured to control the overall communication of the MTC terminal 20. The control unit 220 controls, for example, uplink and downlink communications by the MTC terminal 20 according to scheduling information received from the eNodeB 10.

Furthermore, the control unit 220 controls the wireless communication unit 210 to transmit a wireless signal in a region other than the non-transmission region, in the case where the eNodeB 10 sets the non-transmission region to the resource block for the uplink assigned by the eNodeB 10. In addition, the wireless communication unit 210 performs a receiving process for all of the assigned resource blocks in the downlink.

Moreover, the control unit 220 may have a configuration substantially similar to the non-transmission region setting section 124 of the eNodeB 10. That is, the control unit 220 sets the non-transmission region to a resource block for the uplink assigned by the eNodeB 10.

In this way, the interference between resource blocks in the eNodeB 10 can be prevented by setting the non-transmission region to the resource block for the uplink. In addition, the control unit 220 may estimate the magnitude of the error of a frequency, time, or the like in the MTC terminal 20 and set the non-transmission region according to the magnitude of the error. For example, the control unit 220 may set the non-transmission region to be wide as the error of the MTC terminal 20 becomes large, and may set the non-transmission region to be narrow as the error of the MTC terminal 20 becomes small. This configuration allows degradation of throughput due to setting of the non-transmission region which is wider than necessary to be prevented. In addition, the control unit 120 may estimate, for example, the magnitude of the error in which the MTC terminal 20 contains by using an elapsed time from frame synchronization by the MTC terminal 20, an elapsed time from Timing Advance, a reception success rate, and so on.

5. Conclusion

As described above, according to the embodiments of the present disclosure, even if there is an error in frame synchronization, frequency, or the like of the MTC terminal 20, interference between resource blocks can be prevented by setting the non-transmission region. In addition, according to the embodiments of the present disclosure, interference between Ofdm symbols also can be prevented by lengthening a guard interval. Thus, the number of communication times performed by the MTC terminal 20 to adjust frame synchronization or frequency can be suppressed, thereby reducing power consumption of the MTC terminal 20. In addition, according to the embodiments of the present disclosure, it is expected to reduce time required for a receiving device to obtain channel information by inserting a reference signal intensively into the head of the resource block.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

Furthermore, a computer program for causing hardware such as CPU, ROM and RAM, embedded in the eNodeB 10 and the MTC terminal 20 to realize an equivalent function as each element of the above-mentioned eNodeB 10 and MTC terminal 20 can also be created. Moreover, a storage medium having the computer program stored thereon is also provided.

REFERENCE SIGNS LIST

10 eNodeB
12 MME
14 S-GW
16 PDN-GW
20 MTC terminal
30 MTC server
110, 210 Wireless communication unit
112, 212 MTC reference signal inserting section
114, 214 MTC guard processing section
116, 216 Channel estimating section
120, 220 Control unit
122 Scheduler
124 Non-transmission region setting section
130, 230 Upper layer

The invention claimed is:
1. A wireless communication device comprising:
a wireless communication circuitry for not performing transmission in a non-transmission region of a resource block and for performing transmission in a transmission region of the resource block, the transmission region being a rest of the resource block excluding the non-transmission region of the resource block, the resource block being assigned from among a plurality of resource blocks arranged in a grid pattern on a time axis and a frequency axis, and a resource allocation being performed for each of the plurality of resource blocks, the non-transmission region being set at a boundary with an adjacent resource block in a time direction or a frequency direction, wherein
the non-transmission region is set such that the transmission region of the resource block does not contact with another transmission region of the adjacent resource block, or the non-transmission region and another non-transmission region of the adjacent resource block are set such that all of the boundary between the resource block and the adjacent resource block is contacted by either the non-transmission region or the another non-transmission region of the adjacent resource block.
2. The wireless communication device according to claim 1, further comprising:
a control circuitry for setting the non-transmission region of the resource block.

3. The wireless communication device according to claim 2, wherein the control circuitry sets the non-transmission region at a boundary with at least one of an adjacent resource block in a front side on the time axis or an adjacent resource block in a rear side on the time axis and at a boundary with at least one of an adjacent resource block in an upper side on the frequency axis or an adjacent resource block in a lower side on the frequency axis.

4. The wireless communication device according to claim 3, wherein the control circuitry sets the non-transmission region having a wider area on the resource block as an elapsed time from a synchronization processing with a communication counterpart becomes increased.

5. The wireless communication device according to claim 1, wherein the wireless communication circuitry sets a length of a guard interval part with respect to a length of a data part in each of Ofdm symbols constituting the resource block to be longer than a length defined in LTE.

6. The wireless communication device according to claim 5, wherein the wireless communication circuitry sets the guard interval part in each of the Ofdm symbols to be longer than the data part.

7. The wireless communication device according to claim 1, wherein the wireless communication circuitry uses a region for transmission of each of a plurality of Ofdm symbols as one guard interval part and one data part.

8. The wireless communication device according to claim 7, wherein the wireless communication circuitry sets the guard interval part to be longer than the data part.

9. A wireless communication method comprising:
not performing transmission in a non-transmission region of a resource block and performing transmission, by circuitry, in a transmission region of the resource block, the transmission region being a rest of the resource block excluding the non-transmission region of the resource block, the resource block being assigned from among a plurality of resource blocks arranged in a grid pattern on a time axis and a frequency axis, and a resource allocation being performed for each of the plurality of resource blocks, the non-transmission region being set at a boundary with an adjacent resource block in a time direction or in a frequency direction, wherein
the non-transmission region is set such that the transmission region of the resource block does not contact with another transmission region of the adjacent resource block, or the non-transmission region and another non-transmission region of the adjacent resource block are set such that all of the boundary between the resource block and the adjacent resource block is contacted by either the non-transmission region or the another non-transmission region of the adjacent resource block.

10. A wireless communication device comprising:
a wireless communication circuitry for not performing transmission in a non-transmission region of a resource block and for performing transmission in another region of the resource block, the resource block being assigned from among a plurality of resource blocks arranged in a grid pattern on a time axis and a frequency axis, and the non-transmission region being set at a boundary with an adjacent resource block in a time direction or a frequency direction; and
a control circuitry for setting the non-transmission region in the resource block, wherein
the control circuitry sets the non-transmission region at a boundary with at least one of an adjacent resource block in a front side on the time axis or an adjacent resource block in a rear side on the time axis and at a boundary with at least one of an adjacent resource block in an upper side on the frequency axis or an adjacent resource block in a lower side on the frequency axis, and
the control circuitry sets the non-transmission region having a wider area on the resource block as an elapsed time from a synchronization processing with a communication counterpart becomes increased.

* * * * *